United States Patent [19]

Olson et al.

[11] 4,308,317
[45] Dec. 29, 1981

[54] ABRASION RESISTANT SILICONE COATED POLYCARBONATE ARTICLE

[75] Inventors: Daniel R. Olson; Ona V. Orkin, both of Schenectady; Karen K. Webb, Ballston Lake, all of N.Y.

[73] Assignee: General Electric Company, Pittsfield, Mass.

[21] Appl. No.: 110,887

[22] Filed: Jan. 10, 1980

[51] Int. Cl.$^3$ .................. B44D 1/14; B32B 27/30
[52] U.S. Cl. .................. 428/412; 427/163; 427/164; 427/379; 427/387; 427/412.1; 428/447; 428/451
[58] Field of Search .............. 427/387, 412.1, 162, 427/163, 164, 379; 428/412, 447, 451

[56] References Cited

U.S. PATENT DOCUMENTS

| | | |
|---|---|---|
| 3,582,398 | 6/1971 | Ringler . |
| 3,707,397 | 12/1972 | Gagnon . |
| 3,968,305 | 7/1976 | Oshima et al. |
| 3,968,309 | 7/1976 | Matsuo et al. |
| 3,978,178 | 8/1976 | Oshima et al. |
| 3,986,997 | 10/1976 | Clark . |
| 4,027,073 | 5/1977 | Clark . |
| 4,041,120 | 8/1977 | Oshima et al. |
| 4,045,602 | 8/1977 | Sommer et al. |
| 4,188,451 | 2/1980 | Humphrey ............ 428/412 X |
| 4,207,357 | 6/1980 | Goossens ............ 427/379 X |

Primary Examiner—Michael R. Lusignan
Attorney, Agent, or Firm—William F. Mufatti

[57] ABSTRACT

A shaped, non-opaque coated polycarbonate article having improved abrasion and chemical solvent resistance comprising a polycarbonate substrate having disposed on the surface thereof a non-opaque primer layer of controlled thickness comprised of a thermoset acrylic polymer and disposed on said primer layer a non-opaque top coat comprised of a thermoset organopolysiloxane.

8 Claims, No Drawings

ABRASION RESISTANT SILICONE COATED POLYCARBONATE ARTICLE

This invention relates to non-opaque abrasion and chemical solvent resistant thermoset organopolysiloxane coated shaped polycarbonate articles wherein the organopolysiloxane top coat is uniformly and tenaciously adhered to the polycarbonate substrate. More particularly, the present invention relates to an organopolysiloxane coated polycarbonate article having a thermoset acrylic primer layer of controlled thickness disposed between the polycarbonate substrate and the organopolysiloxane top coat.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion and chemical solvent resistance is relatively low.

In order to overcome this relatively low abrasion resistance and to otherwise improve the surface characteristics of the polycarbonate, various coatings have been applied onto the polycarbonate substrates. U.S. Pat. No. 3,582,398 describes a fabricated polycarbonate part having improved optical properties consisting of a polycarbonate substrate having a transparent coating thereon consisting of a thermoplastic polymethylmethacrylate. U.S. Pat. No. 4,061,652 describes a coating for polycarbonate resins comprised of (i) an acrylic resin which is a mixture of olefinically unsaturated organic monomers in combination with an acrylic polymer, and (ii) certain urethanes of hydroxygenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface. This reference further teaches that the thickness of the thermosettable acrylic polymer primer layer varies between 0.01 mil up to as much as 0.5 mil or even more.

However, organopolysiloxane coated polycarbonate articles which contain a thermoset acrylic polymer primer have heretofore produced erratic results, i.e., in some cases, the polysiloxane top coat adhered and weathered well while in other instances the top coat failed to adhere satisfactorily or failed to weather well.

It has now been surprisingly discovered that if the primer layer is of a thickness of from about 0.015 to about 0.15 mils, then both the adhesion and weatherability of the organopolysiloxane top coat are good. If the primer layer is less than about 0.015 mils thick, the weatherability of the top coat is poor. If the primer layer is thicker than about 0.15 mils, then the adhesion of the top coat to the polycarbonate is poor.

This dependence of the performance of the organopolysiloxane top coat upon the thickness of the primer layer is surprising and has not heretofore been known or recognized by the prior art.

DESCRIPTION OF THE INVENTION

This invention relates to non-opaque organopolysiloxane coated polycarbonate articles having a thermoset acrylic polymer adhesion promoting primer layer of controlled thickness of from about 0.015 to about 0.15 mils disposed between the polycarbonate surface and the thermoset organopolysiloxane top coat.

In the practice of the present invention, prior to the application of the organopolysiloxane top coat to the polycarbonate surface, the surface is first primed by the application thereon of a primer layer of controlled thickness containing a thermoset acrylic polymer.

The aromatic carbonate polymers of the instant invention are known compounds and have recurring units of the formula:

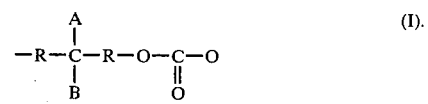

wherein each —R— is selected from the group consisting of phenylene, halo-substituted phenylene and alkyl substituted phenylene; and A and B are each selected from the group consisting of hydrogen, hydrocarbon radicals, free from aliphatic unsaturation and of radicals which together with the adjoining

atom form a cycloalkane radical, the total number of carbon atoms in A and B being up to 12.

These aromatic carbonate polymers may be prepared by methods well known in the art and described in U.S. Pat. Nos. 3,989,672, 3,275,601 and 3,028,365, all of which are incorporated herein by reference.

In the practice of this invention, any of the aromatic polycarbonates can be employed herein. However, particularly useful are the aromatic polycarbonates prepared by reacting a dihydric phenol, such as bisphenol-A (2,2-bis(4-hydroxyphenyl) propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrabromo-4,4'-dihydroxydiphenyl)propane, 2,2-(3,5,3',5'-tetrabromo-4,4'-dihydroxydiphenyl) propane, (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The thermosettable acrylic polymers which are contained in the primer compositions are well known in the art. Exemplary thermosettable acrylics which may be utilized in the practice of this invention are set forth in *Encyclopedia of Polymer Science and Technology,* Vol. 1, Interscience Publishers, John Wiley & Sons, Inc., at p. 273 et seq., and in the *Chemistry of Organic Film Formers,* by D. H. Solomon, John Wiley & Sons, Inc., 1967, at page 251 et seq., and the references cited therein, all of which are hereby incorporated herein by reference.

Generally, the term, thermosettable acrylics, as used herein includes an acrylic polymer or copolymer having reactive functional groups which are capable of reacting between themselves to effect a cross-linkage thereof. These functional groups may be the same, provided they are of the type which will react between themselves, or the polymer or copolymer may contain two or more different types of reactive functional groups, such as, for example, an epoxide group and a carboxyl group. The term, thermosettable acrylics, also includes acrylic polymers or copolymers having a reactive functional group to which there is added an appropriate polymeric cross-linking agent which reacts with the functional group to effect cross-linking. The term, thermosettable acrylics, still further includes a mixture of two or more polymers containing cross-linkable functional reactive groups. These polymers may be acrylic polymers or copolymers having reactable, cross-linkable, functional groups thereon, or at least one of the polymers may be an acrylic polymer or copolymer having a reactive functional group and the other polymer or copolymer may be one or more other types of known polymers having functional groups which are reactive with the acrylic functional group to provide the thermoset product as a result of cross-linking.

Typically, the reactions involved in cross-linking the thermosettable acrylic polymers are reactions between, for example, epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; interreaction between carboxyl and isocyanate groups; reactions between hydroxyl, for example polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butyl-aminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and, more typically, between about 80 parts to about 97 parts.

The thermosettable acrylics are in general applied from primer compositions containing (i) the thermosettable acrylics dissolved in an organic or inorganic solvent, or (ii) an emulsion containing the therosettable acrylics, an alcohol and water. In the case wherein the primer composition contains a thermosettable acrylic dissolved in an organic solvent, the solvent should generally be relatively volatile and inert, i.e., one that will not readily react with or too deleteriously affect the polycarbonate substrate, but which is capable of dissolving the thermosettable acrylic. The primer emulsion compositions, i.e., (ii), are fully described in application Ser. No. 959,588, filed Nov. 13, 1978, which is incorporated herein by reference.

The primer compositions contain sufficient thermosettable acrylic to provide a thermoset acrylic containing primer layer which is from about 0.015 to about 0.15 mil thick. Generally, this requires that the primer compositions contain from about 2 to about 20 weight percent of thermosettable acrylic solids.

The primer compositions of the instant invention may also optionally contain various flatting agents, ultraviolet light absorbent agents, surface-active agents, stabilizers such as antioxidants, and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface-active agent, and ultraviolet light absorbent agents, can be used.

The various surface-active agents, including anionic, cationic and nonionic surface-active agents are described in *Kirk-Othmer Encyclopedia of Chemical Technology,* Vol. 19, Interscience Publishers, New York, 1969, pp. 507–593, and *Encyclopedia of Polymer Science and Technology,* Vol. 13, Interscience Publishers, New York, 1960, pp. 447–486, both of which are references and incorporated herein.

Exemplary ultraviolet light absorbent compounds or stabilizers include those of the hydroxy benzophenone or benzotriazole series, and the cyanoacrylates. Examples of these are: 2-hydroxy-4-n-octoxybenzophenone, substituted hydroxyphenylbenzotriazole, 2-(2'-hydroxy-5'-methylphenyl)benzotriazole, and 2-hydroxy-4-methoxybenzophenone, ethyl 3,3-diphenyl-2-cyanoacrylate, octyl 3,3-diphenyl-2-cyanoacrylate. Further examples of ultraviolet light absorbers which may be used in the practice of this invention may be found in U.S. Pat. No. 3,043,709.

A uniform film of the primer composition containing the further-curable thermosettable acrylic is applied onto the polycarbonate surface by any of the known means such as dipping, spraying, roll-coating, and the like. After the formed polycarbonate part is coated with the primer composition, the inert volatile solvent is removed by drying the coated article until a substantial portion of the volatile solvent evaporates having a solid residue, and thereafter heat is applied to thermoset the thermosettable acrylic, thereby forming a primer layer of coating containing the thermoset acrylic on the polycarbonate surface to which the primer composition was applied. This primer layer is from about 0.015 to about 0.15 mil thick.

After the polycarbonate article which is to be coated has been primed by the application of the primer composition and the evaporation of the solvent component of the primer composition and the thermosetting of the themosettable acrylic, the primed surface of the polycarbonate article is then coated with the thermosettable organopolysiloxane top coating. In the practice of this invention, an organopolysiloxane coating composition containing a further curable organopolysiloxane is applied onto the cured primer and is then cured to form a thermoset organopolysiloxane coating.

The further-curable organopolysiloxane used in the practice of the instant invention is the partial hydrolysis and condensation product of at least one compound represented by the general formula $$R^2{}_n SiZ_{(4-n)} \qquad \text{II.}$$

wherein $R^2$ represents a monovalent hydrocarbon radical and a halogenated monovalent hydrocarbon radical, Z represents a hydrolyzable group and n may vary between 0 and 2. More specifically, Z is independently a member such as halogen, alkoxy, acyloxy and aryloxy.

Preferably, $R^2$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy and the like, an acyloxy radical containing from 2 to about 9 carbon atoms such as acetoxy, propionoxy, butyroxy, pentanoxy, hexanoxy, and the like, and a phenoxy radical; and n varies from 0 to 2.

Preferred compounds of formula II are silanes of the formula $$R^3{}_a Si(OR^4)_{4-a} \qquad \text{III.}$$

and silanes of the formula $$R^5{}_b Si(OCOR^6)_{4-b} \qquad \text{IV.}$$

wherein $R^3$ and $R^5$ represents a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^4$ and $R^6$ represent monovalent hydrocarbon radicals and halogenated monovalent radicals such as alkyl radicals and phenyl radicals, but are preferably alkyl radicals of 1 to 8 carbon atoms; a is 0 or 1; and b varies from 0 to 2.

Upon hydrolysis, the compounds of formula II, and more specifically those of formulae III and IV, are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl group. This partial condensate can be characterized as a further-curable, i.e., further condensable, siloxanol polymer. Generally, during curing of the further-curable organopolysiloxane which has been deposited on the primed polycarbonate substrate, these residual hydroxyls condensate to give a silsequioxane, $R^7 SiO_{3/2}$, wherein $R^7$ represents $R^2$, $R^3$ or $R^5$ above.

The further-curable organopolysiloxane may be formulated into the top-coat composition as a solution of the further-condensable siloxanol polymer in water and alcohol by-product as a concentrated solution of further-condensable siloxanol in water and alcohol by-product formed by evaporating off a substantial quantity of the alcohol by-product and water, or it may be formulated onto the top-coat composition as a solid partially pre-cured product by evaporating off a substantial amount of alcohol by-product and water and then partially precuring and solidifying the concentrated product.

Examples of good silicone top coats are the foregoing alkoxy and aryloxy functional silanes represented by formula III and acyloxy functional silanes represented by formula IV. Such alkoxy functional, aryloxy functional, and acyloxy functional silanes are well known materials to silicone manufacturers and are easily obtainable.

With respect to the acyloxy functional silanes, these materials are generally applied without any solvent since it has been found that the use of solvents in the application of such top coats at times seriously degrades the applied silicone top coat. Preferably, the silanes of Formula IV, that is the acyloxy functional silanes, are applied at 100% solids or from 20 to 100% solids, in the case of the acyloxy silanes where the solids are less than 100% the silane is simply the water hydrolysis and partial condensation product of the foregoing acyloxy functional silanes of Formula IV. The alkoxy and aryloxy functional silanes of Formula III are generally applied from a top-coat composition containing solvents in a solids concentration of from about 20 to 95% by weight. Examples of solvents which may be used in the formulation of the top-coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a top-coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top-coat compositions of the present invention are the partial hydrolysis and condensation products of alkoxy functional silanes, preferably alkyltrialkoxysilanes, preferably those alkyltrialkoxysilanes wherein the alkyl group contains from about 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. The further-curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 70° to 300° C. to produce the solvent-soluble, further curable organopolysiloxane. This precured solvent-soluble, further curable organopolysiloxane is then dissolved in a suitable solvent to form the top-coat composition and the primed polycarbonate solvent is then coated with this top coat composition. The solvent is then evaporated and the residual further-curable oranopolysiloxane is cured to a thermoset state to provide a uniformly and tenaciously adhered top coat on the primed polycarbonate substrate. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure, but the temperature should be below the glass transition temperature of the polycarbonate. Of course, if the glass transition temperature of the polycarbonate is exceeded, then the polycarbonate part may become deformed and lose its utility.

One particular further curable organopolysiloxane that can be employed in the top coat composition of the instant invention is the partial hydrolysis and condensation product of methyltriethoxysilane. This further-curable organopolysiloxane is prepared by hydrolyzing methyltriethoxysilane with wate in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further curable organopolysiloxane. The solid, solvent-soluble, further-curable organopolysiloxane is then dissolved to a desired concentration in a suitable solvent to form the top coat composition. The top coat composition is then applied to the primed polycarbonate substrate, after which the solvent is evaporated and the further-curable organopolysiloxane finally cured to provide a hard, abrasion and chemical solvent resistant, thermoset organopolysiloxane top coat in the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethyoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further-curable organopolysiloxane. The solid, solvent-soluble, further-curable organopolysiloxane is then dissolved to a desired concentration in a suitable solvent to form the top-coat composition containing a further-curable organopolysiloxane. The top-coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

These are not the only silicones that may be utilized in the top-coats of the instant invention. Less preferred silicones which can be utilized to form the top coats of the present invention are, for instance, silicone resins compsoed of trifunctional and difunctional units, silicone resins composed of trifunctional units, difunctional units and tetrafunctional units when the organo substituent groups in the trifunctional units may be selected from hydrocarbon radicals of 1 to about 8 carbon atoms and are preferably methyl, phenyl and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins usually have an organic to silicon atom ratio of 1:1 to 1.9:1; may have a silanol content that varies anywhere from 4 to 10 weight percent and optionally may have an alkoxy content that varies from 2 to 4%. The preparations of such silicone resins which may be utilized as top-coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

These silicones may also contain various fillers such as, for example, glass fibers, talc and silica, preferably colloidal silica.

The top-coat compositions containing the aforedescribed silicones are simply brushed, dipped, sprayed or flowed on top of the primer layer that is applied to the polycarbonate substrate. The solvent, or alcohol by-product and water, present in the top-coat composition is evaporated and the residual further-curable organopolysiloxane is cured to form a thermoset organopolysiloxane top coat. Preferably, the further-curable organopolysiloxane is cured at elevated temperatures. Although certain catalysts may be utilized to accelerate the cure of the further-curable organopolysiloxane, such catalysts are not necessary if the further-curable organopolysiloxane is cured by itself at the elevated temperature for a sufficient length of time.

Another embodiment of the present invention is a process for producing a durable adherent, mar, and chemical resistant silicone coating on a polycarbonate article. The process comprises the steps of: (i) applying onto the polycarbonate substrate a primer composition containing a thermosettable acrylic polymer dissolved in a suitable solvent; (ii) evaporating of the solvent to leave a solid thermosettable acrylic polymer containing primer layer on the polycarbonate substrate; (iii) applying heat to the polycarbonate substrate containing the thermosettable acrylic polymer to thermoset said thermosettable acrylic polymer to a thermoset acrylic polymer; (iv) applying a top-coat composition containing a further-curable organopolysiloxane onto the primed polycarbonate substrate; (v) evaporating off the volatile solvents present in the top coat composition to form a residue of further-curable organopolysiloxane on the primed polycarbonate substrate; and (vi) curing the further-curable organopolysiloxane to form a top coat containing a thermoset organopolysiloxane.

PREFERRED EMBODIMENT OF THE INVENTION

In order that those skilled in the art may better understand how the present invention may be practiced, the following examples are given by way of illustration and not by way of limitation.

EXAMPLE 1

An aromatic polycarbonate is prepared by reacting 2,2-bis(4-hydroxyphenyl)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about $\frac{1}{8}$ in. thick. The test panels are subjected to an abrasion test. The abrasion test is one wherein test panels having a $\frac{1}{4}$-inch diameter hole cut in the center are subjected to a Taber Abraser. The Taber Abraser is equipped with CS-10F wheels which are resurfaced every 200 cycles by abrading for 25 cycles on an S-11 refacing disc. The weights used in combination with the CS-10F wheels are 500 gm. weights. Initial measurements of % Haze are made at four places around the future wear track of the sample using a Gardner Hazemeter. The sample is abraded for 300 cycles, cleaned with isopropanol, and the % Haze is remeasured at the same four places. The four differences in % Haze are calculated and averaged to give the Δ% Haze. The results of this abrasion test are set forth in Table I.

A further curable organopolysiloxane top coat composition is prepared as follows: To 100 parts by weight of a commercially available solution containing a further-curable organopolysiloxane dissolved in a suitable solvent is added 2 parts by weight of a commercially available curing catalyst solution to form a top-coat composition. This further-curable organopolysiloxane is available from Resart-Ihm A.G., Mainz, Federal Republic of Germany, as their Resarix SF/PC ® and is a solution containing about 32 weight percent of a partial hydrolysis and condensation product of methyl triethoxysilane dissolved in an ethanol-tetrahydrofuran-n-butanol-ethoxyethanol solvent system. The catalyst consists of a solution containing 2 weight percent of tetraethylammonium hydroxide dissolved in methanol.

EXAMPLE 2

This Example illustrates a primed, top coated polycarbonate article falling outside the scope of the instant invention in that the cured primer layer is less than 0.015 mil thick. Sixty-five (65) parts by weight of Carboset 525 (a carboxyl functional acrylic sold by B. F. Goodrich Co.), thirty-five (35) parts by weight of CY179 (a difunctional aliphatic epoxide sold by Ciba Geigy), and 2 parts by weight of toluenesulfonic acid are mixed with a sufficient amount of butoxyethanol to give a primer composition containing 1 weight percent solids. This composition is flow coated onto polycarbonate test panels prepared substantially in accordance with Example 1. The coated test panels are allowed to drain for 10 minutes, are air dried for 30 minutes, and are then heated at 125° C. for 1 hour to cure the thermosettable acrylic to the thermoset stage. The thickness of the cured primer layer is 0.01 mil. The primed test panels are then flow coated with the organopolysiloxane top coat composition prepared substantially in accordance with the procedure as set forth above. Excess top coat solution is allowed to drain off and the panels are allowed to air dry for 30 minutes to evaporate off a substantial portion of the solvent. The panels are then baked for 1 hour at 125° C. to effect the cure of the further-curable organopolysiloxane. The primed top coated test panels are subjected to an adhesion test both before and after exposure to an RS sunlamp and the results are set forth in TABLE I. The adhesion test consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off. A sample fails the adhesion test if any of the squares in the grid are pulledd off.

EXAMPLE 3

A primer containing 65 parts by weight of Carboset 525 (a carboxyl functional acrylic sold by B. F. Goodrich Co.), 25 parts by weight of CY179, 10 parts by weight of condensed ethyl silicate, 2 parts by weight toluenesulfonic acid, and sufficient butoxyethanol solvent to result in a cured primer layer having a thickness of 0.01 mil is prep ared. This composition is flow coated onto a polycarbonate test panel prepared substantially in accordance with Example 1. The coated test panel is allowed to drain for 10 minutes, is air dired for 30 minutes, and is heated at 125° C. for 1 hour to cure the thermosettable acrylic to the thermoset stage. The thickness of the cured primer layer is 0.01 mil. The primed test panels are then flow coated with the organopolysiloxane top coat composition prepared substantially in accordance with the procedure set forth above. Excess top coat solution is allowed to drain off and the panels are allowed to air dry for 30 minutes to evaporate off a substantial portion of the solvent. The panels are then baked for 1 hour at 125° C. to effect the cure of the further curable organopolysiloxane. The primed top coated test panels are subjected to the adhesion test and to the abrasion test and the results are set forth in TABLE I.

EXAMPLE 4

Test panels are prepared substantially in accordance with the procedures set forth in Example 3 except that sufficient butoxyethanol solvent is utilized to give a cured primer layer having a thickness of 0.04 mil. The primed top coated test panels are subjected to the adhesion test and to the abrasion test and the results are set forth in TABLE I.

EXAMPLE 5

Test panels are prepared substantially in accordance with the procedure set forth in Example 2 except that sufficient butoxyethanol solvent is utilized to give a primer composition containing about 9% solids. This resulting primer layer, when cured, has a thickness of 0.045 mils. The primed top coated test panels are subjected to the adhesion test both before and after exposure to the RS sunlamp and the results are set forth in TABLE I.

EXAMPLE 6

Test panels are prepared substantially in accordance with the procedure set forth in Example 3 except that sufficient butoxyethanol solvent is utilized to give a cured primer layer having a thickness of 0.09 mils. The primed top coated test panels are subjected to the adhesion test and to the abrasion test and the results are set forth in TABLE I.

EXAMPLE 7

Test panels are prepared substantially in accordance with the procedure set forth in Example 2 except that sufficient butoxyethanol solvent is utilized to give a primer composition containing about 9% solids. This resulting primer layer, when cured, has a thickness of 0.12 mils. The primed top coated test panels are subjected to the adhesion test bath before and after exposure to the RS sunlamp and the results are set forth in TABLE I.

EXAMPLE 8

This example illustrates a primed, top coated polycarbonate article falling outside the scope of the instant invention in that the primer layer is thicker than 0.15 mils. Test panels are prepared substantially in accordance with the procedure set forth in Example 3 except that sufficient butoxyethanol solvent is utilized to give a cured primer layer having a thickness of 0.17 mils. The primed top coated test panels are subjected to the adhesion test and to the abrasion test and the results are set forth in TABLE I.

EXAMPLE 9

This example illustrates a primed, top coated polycarbonate article falling outside the scope of the instant invention in that the primer layer is thicker than 0.15 mils. A primer composition containing 90 parts by weight of Acryloid AT-50 (a thermosettable acrylic sold by Rohm and Haas Co.), 10 parts by weight of Cymel 303 (a melamine sold by American Cyanamid Co.), 2 parts by weight of toluenesulfonic acid, and sufficient butoxyethanol solvent to result in a cured primer layer having a thickness of 0.3 mils is prepared. This composition is flow coated onto a polycarbonate test panel prepared substantially in accordance with Example 1. The coated test panel is allowed to drain for 10 minutes, is air dried for 30 minutes, and is heated at 125° C. for 1 hour to cure the thermosettable acrylic to the thermoset stage. The thickness of the cured primer layer is 0.3 mils. The primed test panels are flow coated with the organopolysiloxane top coat composition prepared substantially in accordance with the procedure set forth above. Excess top coat solution is allowed to drain and the panels are air dried for 30 minutes to evaporate off a substantial portion of the solvent. The panels are then baked for 1 hour at 125° C. to effect the cure of the further curable organopolysiloxane. The primed, top coated test panels are subjected to the adhesion test and the results are set forth in TABLE I.

TABLE I

| Example | Thickness, in mils, of Primer Layer | Initial Adhesion | Adhesion after Exposure to RS Sunlamp | Δ % Haze, 300 cycles |
|---|---|---|---|---|
| 1 (uncoated) | — | — | — | 34 |
| 2 | 0.01 | Pass | Fails after 192 hours | — |
| 3 | 0.01 | Pass | — | 2.5 |
| 4 | 0.04 | Pass | — | 3.7 |
| 5 | 0.045 | Pass | Passes after 792 Hours | — |
| 6 | 0.09 | Pass | — | 8.0 |
| 7 | 0.12 | Pass | Passes after 792 hours | — |
| 8 | 0.17 | Pass | — | 29 |
| 9 | 0.3 | Fails | — | — |

TABLE I clearly demonstrates that a primer thickness of from 0.015 to 0.15 mils is critical. Thus, in Examples 3-7, wherein the primer thickness is in the range of from about 0.015 to about 0.15 mils, the initial adhesion, weathering (adhesion after exposure to RS sunlamp), and abrasion resistance of the primed, thermoset organopolysiloxane top coated polycarbonate test panels are all good. In Example 1, wherein the primer is thinner than 0.015 mils, the weathering of the top coat is poor (the top coat fails the adhesion test after 192 hours). In Examples 8 and 9, wherein the primer is thicker than 0.15 mils, both the abrasion resistance and adhesion of the organopolysiloxane top coat are poor.

While the invention has been described above with particularity, it will, of course, be apparent that modifications may be made which, pursuant to the patent statutes and laws, do not depart from the spirit and scope of the invention.

What we calim as new and desire to secure by Letters Patent of the United States is:

1. An improved coated polycarbonate article having improved abrasion and chemical solvent resistance and exhibiting improved weatherability and adhesion of the coating comprising a polycarbonate substrate having adhered on at least one surface thereof (i) an adhesion promoting primer layer consisting essentially of a thermoset acrylic polymer; and (ii) a top coat adherently disposed on said primer layer comprised of a thermoset organopolysiloxane; said improvement consisting essentially of said primer layer having a controlled thickness of from about 0.015 to about 0.15 mils.

2. The article of claim 1 wherein said thermoset organopolysiloxane is the hydrolysis and condensation product of an alkyl trialkoxysilane.

3. The article of claim 1 wherein said trialkoxysilane is an alkyl triethoxysilane.

4. The article of claim 2 wherein said alkyl trialkoxysilane is a methyl trialkoxysilane.

5. The article of claim 4 wherein said methyl trialkoxysilane is methyl triethoxysilane.

6. The article of claim 1 wherein said thermoset acrylic polymer is the thermally cured product of a thermosettable acrylic polymer.

7. An improved coated polycarbonate article having improved abrasion and chemical solvent resistance and exhibiting improved weatherability and adhesion of the coating comprising a polycarbonate substrate having adhered on at least one surface thereof (i) an adhesion promoting primer layer consisting essentially of a thermoset acrylic polymer and at least one ultraviolet radiation absorbing compound; and (ii) a top coat adherently disposed on said primer layer comprised of a thermoset organopolysiloxane; said improvement consisting essentially of said primer layer having a controlled thickness of from about 0.015 to about 0.15 mils.

8. The article of claim 7 wherein said thermoset organopolysiloxane is the hydrolysis and condensation product of at least one alkyltrialkoxysilane.

* * * * *